United States Patent Office 3,098,077
Patented July 16, 1963

3,098,077
CERTAIN 2-(4-HALOPHENYL)-3-PYRIDYL-
BUTANE-DIOLS
Milton Joel Allen, Summit, N.J., assignor to Ciba
Corporation, a corporation of Delaware
No Drawing. Filed Dec. 7, 1959, Ser. No. 857,584
2 Claims. (Cl. 260—297)

The present invention concerns pyridyl compounds. It relates, more especially, to 2-pyridyl indenes of the formula:

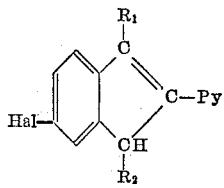

in which $R_1$ represents lower alkyl and $R_2$ stands for hydrogen or lower alkyl, Py represents a 3-pyridyl or a 4-pyridyl radical and Hal stands for halogen, as well as process for the preparation of such compounds.

$R_1$, representing lower alkyl, stands primarily for methyl; other lower alkyl radicals are, for example, ethyl, n-propyl, isopropyl and the like. The radical $R_2$ represents primarily hydrogen, but may also stand for lower alkyl, particularly methyl, ethyl and the like.

A pyridyl radical represents 3-pyridyl or 4-pyridyl; such radicals may also be substituted in any of the available positions by one or more than one of the same or of different substituents; such substituents are, for example, lower alkyl, e.g. methyl, ethyl and the like, lower alkoxy, e.g. methoxy, ethoxy and the like, or halogen, e.g. fluorine, chlorine, bromine and the like.

The halogen atom Hal, attached to the 6-position of the indene nucleus stands primarily for chlorine; fluorine, bromine and the like, are other halogen atoms, which may replace chlorine in that particular position.

The compounds of the present invention inhibit the function of the adrenal cortex, which is manifested in a decrease of hydrocortisone output in dog tests, as well as in a depression of the secretion of aldosterone and other corticosteroids in rat tests. Adrenal cortex inhibitors, which cause a decrease of hydrocortisone and corticosterone, are known. But this decrease may be accompanied by a simultaneous increase of desoxycorticosterone and of 11-desoxy-17α-hydroxy-corticosterone (Reichstein S), which steroids are possible precursors of hydrocortisone and corticosterone; this increase partially offsets the beneficial inhibition of the secretion of the latter. Contrary to the effects of these adrenal cortex inhibitors, the compounds of the present invention do not show such a shift in the secretion pattern; they have, therefore, greatly improved properties over those of known adrenal cortex inhibitors. They can be used as agents in the treatment of conditions which are due to primary hyperfunction of the adrenal cortex, such as Cushing's syndrome, primary aldosteronism and the like. They also have a beneficial effect in the treatment of secondary hyperfunction of that vital gland, such as secondary aldosteronism, which includes conditions such as liver cirrhosis, congestive heart failure, nephrotic syndrome and the like.

A pronounced inhibiting effect on the secretion of the adrenal cortex is exhibited by compounds of the formula:

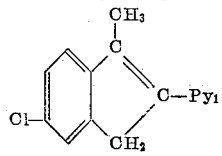

in which $Py_1$ stands for 3-pyridyl or 4-pyridyl. The 6-chloro-3-methyl-2-(3-pyridyl)-indene has an outstanding adrenal cortex inhibiting activity.

The compounds of this invention may be used as medicaments in the form of pharmaceutical preparations, which contain the new 2-pyridyl-indene compounds in admixture with a pharmaceutical organic or inorganic, solid or liquid carrier suitable for enteral or parenteral administration. For making up the preparations there may be employed substances which do not react with the new compounds, such as water, gelatine, lactose, starches, magnesium stearate, talc, vegetable oils, benzyl alcohols, gums, polyalkylene glycols or any other known carrier for medicaments. The pharmaceutical preparations may be in the solid form, for example, as capsules, tablets, dragees and the like, or in liquid form, for example, as solutions, suspensions, emulsions and the like. If desired, they may contain auxiliary substances, such as preserving agents, stabilizing agents, wetting or emulsifying agents, salts for varying the osmotic pressure, buffers and the like. They may also contain, in combination, other therapeutically useful substances.

The compounds of the present invention may be prepared, for example, by contacting a compound of the formula:

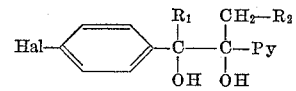

in which $R_1$, $R_2$, Hal and Py have the previously indicated meaning, or a salt thereof, with a strong Lewis acid, and isolating the resulting indene compound.

Salts of the starting materials, such as those with mineral acids, e.g. hydrochloric, sulfuric, phosphoric acid and the like, may be formed in situ in the presence of the acidic medium used for the rearrangement of the diol.

Strong Lewis acids capable of bringing about the rearrangement and dehydrogenation of the diol compounds or the salts thereof, are especially strong inorganic acids, such as sulfuric acid, hydrochloric acid, hydrobromic acid, perchloric acid, phosphoric acid (for example, in the form of polyphosphoric acid) and the like, whereby hydrochloric acid is the preferred reagent. Advantageously, the reagents are used in concentrated form; concentrated aqueous hydrochloric acid is the reagent of choice. The rearrangement and dehydration may be carried out at room temperature, but is preferably performed at an elevated temperature, for example, at from about 50° to about 200° C. Instead of carrying out the reaction at atmospheric pressure, a closed vessel may be utilized to provide increased pressure. To avoid contact with atmospheric oxygen the reaction may be performed in the presence of an inert gas, e.g. nitrogen.

A resulting mixture may be separated into the single compounds according to known methods such as, for example, crystallization and/or recrystallization from different solvents or solvent mixtures, adsorption on an adsorbent, such as aluminum oxide, silicic acid, a diatomaceous earth and the like, and subsequent elution, formation of derivatives and separation of derivatives from unreacted material (for example, ketonic material may be eliminated from non-ketonic portions by reacting a mixture containing ketone compounds with a ketone reagent, such as, for example, a hydrazine compound, e.g. 2,4-dinitrophenyl-hydrazine, Girard's reagent and the like and separating the ketone derivative from the unreacted material), or any other suitable procedure.

By-products which may be formed in the above-described rearrangement reaction are, for example, the rearrangement compounds of the formula:

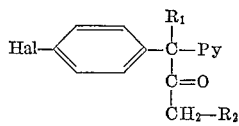

in which $R_1$, $R_2$, Hal and Py have the previously mentioned meaning. These ketonic compounds also show adrenal inhibiting effects and can be used in conditions, such as those described hereinabove; they are new and are intended to be included within the scope of the invention. Particular activity is exhibited by compounds of the formula:

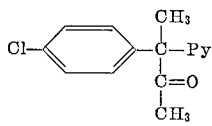

in which Py stands for 3-pyridyl and 4-pyridyl, which group is illustrated by 3-(4-chloro-phenyl)-3-(3-pyridyl)-butan-2-one.

The diol compounds of the formula:

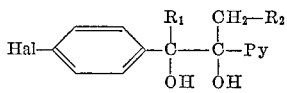

in which $R_1$, $R_2$, Hal and Py have the previously given meaning, and their acid addition salts, which are used as the starting materials in the above reaction, are new and are intended to be included within the scope of the invention. Particularly useful as starting materials are the diols of the formula:

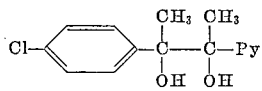

in which Py represents 3-pyridyl or 4-pyridyl, and acid addition salts thereof; this group may be represented by 2-(4-chloro-phenyl)-2,3-dihydroxy-3-(3-pyridyl)-butane and the acid addition salts thereof.

These diols may be prepared, for example, by subjecting a mixture consisting of a ketone of the formula:

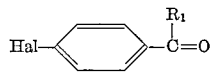

in which $R_1$ and Hal have the previously indicated meaning, and a ketone of the formula:

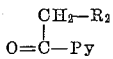

in which $R_2$ and Py have the previously given meaning, to a reduction procedure, and isolating the desired diol of the formula:

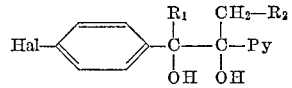

in which $R_1$, $R_2$, Hal and Py have the previously given meaning, and, if desired, converting a resulting salt into the free base, and/or, if desired, converting a free compound into a salt thereof.

The reduction procedure may be carried out according to methods used for the preparation of analogous diols. For example, a solution of the mixture in a proper solvent or solvent mixture, for example, a mixture of a lower alkanol, e.g. methanol, ethanol and the like, and water, or any other appropriate solvent system, may form the catholyte in an electrolytic reduction procedure. Additional substances, which enhance the reduction, such as salts, for example, alkali metal salts of organic acids, e.g. sodium acetate, potassium acetate and the like, may be present in the catholyte. A suitable solution, such as, for example, an aqueous solution of potassium carbonate and the like, may serve as an anolyte. The two electrolytes may be separated by a diaphragm, such as an ion exchange resin membrane, porous porcelain membrane, parchment and the like. The reduction is generally performed on a cathode having a high overpotential and at an initial current density greater than about 0.1 amp./cm.² Cathodes of high overpotential are, for example, those which have an overpotential equal to or higher than cadimum, such as mercury, lead amalgam, lead and the like. Any appropriate anode, such as nickel, platinum, carbon, lead, stainless steel and the like, may be employed. An initial current density greater than about 0.1 amp./cm.² is sufficient to form the desired diol compound; however, for practical reasons an initial current density higher than about 0.5 amp./cm.² may diminish the efficiency of the process due to increased hydrogen evolution.

The reduction procedure may also be carried out, for example, by irradiating the previously mentioned mixture of the two ketones with light, particularly ultraviolet light, in the presence of a hydrogen donor, such as a secondary lower alkanol, especially isopropanol. The irradiation may by carried out at room temperature or at an elevated temperature.

The reduction of a mixture of the two ketones having the previously mentioned formulae gives rise to a mixture of different products; these products are mainly the desired asymmetrically substituted diol and the symmetrically substituted diols formed by dimerization of the two resulting secondary alcohols; the desired asymmetrically substituted diol can be separated from the symmetrically substituted diols according to known methods, for example, by fractionated extraction, fractionated distillation and/or adsorption on a suitable adsorbent, e.g. aluminum oxide and the like, and subsequent elution and the like.

The compounds of the present invention may form therapeutically acceptable acid addition salts, particularly with mineral acids, e.g. hydrochloric, sulfuric acid and the like, or with organic acids, e.g. tartaric acid and the like. Salts may be obtained by reacting the free base with the appropriate inorganic or organic acid; for example, a solution of the free base in a lower alkanol, e.g. methanol, ethanol, n-propanol, isopropanol and the like, an ether, e.g. diethylether, tetrahydrofuran, p-dioxane and the like, a lower alkanone, e.g. acetone and the like, a halogenated hydrocarbon, e.g. methylene chloride, chloroform, ethylene chloride and the like, or any other suitable solvent, may be treated with the acid or a solution thereof and the resulting salt may be isolated or may be kept in solution. Salts of the new compounds of this invention may be converted into the free bases, for example, by treatment with an alkaline reagent, e.g. aqueous ammonia and the like.

The 2-pyridyl-indene compounds of the present invention may also form quaternary ammonium compounds, especially lower alkyl quaternary ammonium salts, such as, for example, halides, sulfates, sulfonates, and the like. They may be formed, for example, by reacting the free base with a lower alkyl halide, e.g. methyl, ethyl, n-propyl or isopropyl chloride, bromide or iodide and the like, a di-lower alkyl sulfate, e.g. dimethyl sulfate, diethyl sulfate and the like, or a lower alkyl lower alkane sulfonate, e.g. methyl or ethyl methane or ethane sulfonate and the like. The quaternizing reaction is performed according to known methods, for example, in the absence or presence of a solvent, such as, a lower alkanol, e.g. methanol, ethanol, n-propanol, isopropanol and the like, a lower alkanone and the like, a formamide, e.g. N,N-dimethylformamide, formamide and the like, or any other suitable solvent, under cooling, at room temperature or at an elevated temperature, and, if desired, in a closed vessel under pressure.

The invention also comprises any modification of the general process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following example is intended to illustrate the invention and is not to be construed as being a limitation thereon. Temperatures are given in degrees centigrade.

*Example*

A solution of 2.26 g. of 2-(4-chloro-phenyl)-3-(3-pyridyl)-butan-2,3-diol in 30 ml. of concentrated aqueous hydrochloric acid is refluxed for six hours. A precipitate is formed upon neutralizing the reaction mixture with concentrated aqueous sodium hydroxide and is filtered off. The resulting 6-chloro-3-methyl-2-(3-pyridyl)-indene of the formula:

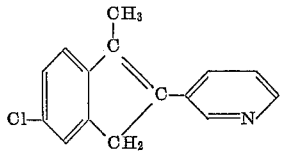

is recrystallized from a mixture of ethanol and water and melts at 99°.

From the recrystallization mother liquors the simultaneously formed rearrangement product 3-(4-chloro-phenyl)-3-(3-pyridyl)-butan-2-one can be isolated.

The starting material may be prepared as follows: To a solution of 2.42 g. of 3-acetyl-pyridine and 3.09 g. of 4-chloro-acetophenone in 25 ml. of ethanol is added 15 g. of potassium acetate in 17 ml. of water and placed into the cathode chamber containing a mercury cathode with a surface of 17.2 cm.² An Alundum membrane separates the catholyte from the anolyte, which consists of a 40 percent aqueous solution of potassium carbonate. A nickel electrode is used as the anode. The electrolysis is carried out at a catholyte temperature of 83° (refluxing) and at a reference potential of $-1.7$ volts vs. a standard calomel electrode; the initial current is 6.8 amps., which drops to a final current of 0.2 amp. after 30 minutes.

The catholyte is removed and concentrated to a small volume under reduced pressure; upon chilling an oily precipitate is formed, which is collected and washed with water. A solution of the solid material in n-butanol is extracted with 1 N aqueous hydrochloric acid. The acidic extracts are made basic with concentrated aqueous sodium hydroxide and extracted with n-butanol. The organic layer is evaporated to dryness, the residue is dissolved in benzene, the benzene solution is filtered and the filtrate is placed on a column containing aluminum oxide (neutral, activity No. 3). The column is washed with benzene and then eluted with a 3:1-mixture of benzene and diethylether. The solvents are evaporated from the eluate, the residue is distilled and the desired diol is collected at 160°/0.001 mm. The distillate is triturated with n-pentane to yield the 2-(4-chloro-phenyl)-3-(3-pyridyl)-butan-2,3-diol, M.P. 86–90°.

Upon treatment of 2-(4-chloro-phenyl)-3-(4-pyridyl)-butan-2,3-diol, 2-(4-bromo-phenyl)-3-(3-pyridyl)-butan-2,3-diol, 2-(4-fluoro-phenyl)-3-(3-pyridyl)-butan-2,3-diol or 3-(4-chloro-phenyl)-4-(3-pyridyl)-hexan-3,4-diol (which diols may be prepared according to the method shown hereinbefore by selecting the appropriate starting materials) with a strong Lewis acid, e.g. concentrated aqueous hydrochloric acid and the like, according to the above-given procedure, the 6-chloro-3-methyl-2-(4-pyridyl)-indene, 6-bromo-3-methyl-2-(3-pyridyl)-indene, 6-fluoro-3-methyl-2-(3-pyridyl)-indene and the 6-chloro-3-ethyl-1-methyl-2-(3-pyridyl)-indene, respectively, are being formed.

What is claimed is:

1. A member selected from the group consisting of a compound of the formula:

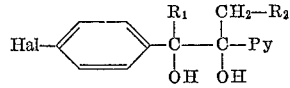

in which $R_1$ is lower alkyl, $R_2$ stands for a member of the group consisting of hydrogen and lower alkyl, Py stands for a member of the group consisting of 3-pyridyl and 4-pyridyl, and Hal represents halogeno, and acid addition salts thereof.

2. 2-(4-chloro-phenyl)-3-(3-pyridyl)-butan-2,3-diol.

References Cited in the file of this patent

UNITED STATES PATENTS

| | | |
|---|---|---|
| 2,624,740 | Hesse | Jan. 6, 1953 |
| 2,794,807 | Krapcho | June 4, 1957 |
| 2,844,588 | Siebenmann et al. | July 22, 1958 |
| 2,889,329 | Luvisi | June 2, 1959 |
| 2,894,952 | Amstutz et al. | July 14, 1959 |
| 2,971,000 | Mathes et al. | Feb. 7, 1961 |
| 2,976,291 | Jacob et al. | Mar. 21, 1961 |

FOREIGN PATENTS

| | | |
|---|---|---|
| 1,196,440 | France | May 25, 1959 |
| 1,199,239 | France | June 22, 1959 |

OTHER REFERENCES

Temnikova et al.: Chem. Abstracts, volume 47, column 4857 (1953).